United States Patent [19]

Isozumi

[11] Patent Number: 4,926,706

[45] Date of Patent: May 22, 1990

[54] COAXIAL ENGINE STARTER

[75] Inventor: Shuzoo Isozumi, Himeji, Japan

[73] Assignee: Mitsubishi Denki Kabushiki Kaisha, Tokyo, Japan

[21] Appl. No.: 318,561

[22] Filed: Mar. 3, 1989

[30] Foreign Application Priority Data

Mar. 3, 1988 [JP] Japan .................................. 63-51021

[51] Int. Cl.[5] ........................ F02N 11/00; F16H 57/02

[52] U.S. Cl. ........................................ 74/7 A; 74/7 E; 74/606 R

[58] Field of Search .................... 74/7 A, 7 E, 606 R, 74/7 R, 6; 403/337, 4

[56] References Cited

U.S. PATENT DOCUMENTS

| | | | |
|---|---|---|---|
| 2,149,009 | 2/1939 | Chievitz | 74/606 R |
| 2,905,010 | 9/1959 | Rieser | 74/606 R |
| 3,772,921 | 11/1973 | Carlson et al. | 74/7 A |
| 3,851,532 | 12/1974 | Pflüger et al. | 74/7 A |
| 4,362,065 | 12/1982 | Baratti | 74/7 A |
| 4,525,632 | 6/1985 | Tanaka | 290/38 |
| 4,744,436 | 5/1988 | Uchiyama | 74/606 R X |
| 4,808,836 | 2/1989 | Isozumi et al. | 74/6 X |

FOREIGN PATENT DOCUMENTS 1311876 11/1962 France .

*Primary Examiner*—Allan D. Herrmann

*Assistant Examiner*—Janice E. Chartoff

*Attorney, Agent, or Firm*—Sughrue, Mion, Zinn, Macpeak & Seas

[57] ABSTRACT

A coaxial engine starter comprises an electric motor having a tubular armature rotary shaft and an output rotary shaft disposed at the front end of the electric motor and having at one end a pinion capable of engaging and disengaging an engine ring gear and axially slidably inserted into an inner bore of the armature rotary shaft at the other end. The starter also comprises a planetary speed reduction gear for reducing the rotational speed of the armature rotary shaft, an over-running clutch including a clutch inner member fitted on the output rotary shaft for transmitting the rotation of the armature rotary shaft to the output rotary shaft, and a front bracket including an inner front bracket connected to the electric motor and an outer front bracket connected to the inner front bracket is provided. Also provided is a ball bearing having an inner and an outer race for rotatably supporting the output rotary shaft. The inner race of the bearing is held in its position by the clutch inner member and the pinion, and the outer race of the bearing is held in its position by the inner front bracket and the outer front bracket. The outer front bracket may be detachably connected to the inner front bracket so that the outer front bracket can be detached and attached without disassembling the components contained therein.

2 Claims, 2 Drawing Sheets

COAXIAL ENGINE STARTER

BACKGROUND OF THE INVENTION

This invention relates to a coaxial engine starter and, more particularly, to a coaxial engine starter for a vehicular engine.

According to the conventional coaxial engine starter 10 shown in FIG. 1, a d.c. electric motor 1 has a hollow armature rotary shaft 2 and a plunger rod 4 of a solenoid switch 3 positioned at the rear end of the d.c. motor 1 is inserted into an inner passage 2a of the armature rotary shaft 2 so that the inserted front end of the plunger rod 4 abuts against the rear end of an output rotary shaft 5 coaxially disposed at the front end of the armature rotary shaft 2 and inserted into the inner passage 2a of the armature rotary shaft 2, whereby the output rotary shaft 5 can be pushed forward.

It is seen that a sun gear 10a is formed on the outer circumference of the front end of the armature rotary shaft 2 and a plurality of planetary gears 10b are in mesh with the sun gear 10a. These planetary gears 10b also mesh with an inner gear 9 formed in the inner circumferential surface of the front frame 13 and are rotatably supported by shafts 11 secured on a carrier 8. The sungear 10a, the planetary gears 10b, the inner gear 9, the shafts 11 and the carrier 8 together constitute a planetary speed reduction gear 10 which reduces the rotational speed of the armature rotary shaft 2. On the output rotary shaft 5, an over-running clutch 8 is fit, of which clutch inner member 8b is engaged with the output rotary shaft 5 by helical splines 5c of spline formation portion 5b having an outer diameter larger than the inner diameter of the inner passage 5a of the armature rotary shaft 2, so that the output rotary shaft 5 is allowed to axially slide while being rotated by the clutch inner member 8b. On the front end of the output rotary shaft 5, a pinion 6 which engages and disengages relative to the engine ring gear (not shown) is mounted. When the output rotary shaft 5 is moved forward, the pinion 6 meshes the engine ring gear to rotate the engine.

However, in the coaxial engine starter of the above construction, the rear end surface of the large-diameter. spline formation portion 5b of the output rotary shaft 5 directly bumps and exerts a thrust against the front end surface of the armature rotary shaft 2 when the output rotary shaft 5 which has moved forward by the plunger rod 4 of the solenoid switch 3 is returned to its original position by the action of the spring 12. Also, the rear end surface of the clutch inner member 8b and the armature rotary shaft 2 rotate relative to each other with a significant slip therebetween. More particularly, since the rotation of the output rotary shaft 5 of this coaxial engine starter is transmitted to an engine ring gear (not shown) through the pinion 6, the output rotary shaft 5 is reversely driven to rotate at a high speed by the engine ring gear until the pinion 6 disengages the ring gear after the engine has been started. Therefore, the high speed rotation of the output rotary shaft 5 driven by the engine is interrupted by the one-way clutch mechanism 8 in order not to be transmitted to the armature rotary shaft 2 to protect the d.c. motor. However, since the rotational speed of the clutch inner member 8b engaged with the output rotary shaft 5 through the helical spline and the rotational speed of the armature rotary shaft 2 are greatly different from each other, a very rapid wear is observed at the interface between the clutch inner member 8b and the output rotary shaft 5. Moreover, the output rotary shaft 5 hits against the armature rotary shaft 2 with a significant impact and slips therebetween; this interface between the output rotary shaft 5 and the armature rotary shaft 2 is also very easily damaged. For the above reasons, the conventional coaxial engine starter has only a relatively short operating life which is not entirely satisfactory.

Further, the front bracket 13 for mounting the starter to an engine must be configured and dimensioned in accordance with the configuration and the dimension of the mounting portion of the different type of the engine. Therefore, several types of the front bracket must be designed separately for each model of the engine. When an already assembled starter is to be used with a different engine, the front bracket 13 must be disassembled and the several parts within the casing such as the drive force transmitting mechanism 9 and the output rotary shaft 5 must be disassembled and the starter must be reassembled with another front bracket which fits for that particular engine. During the disassembling and reassembling of the starter in order to change the front bracket, the over-running clutch mechanism 8 and the speed reduction planetary gear 10 are exposed and must be disassembled, so that these parts are quite easily polluted by dust or foreign matter and that those parts connected to the d.c. motor must be re-assembled.

Thus, the conventional coaxial engine starter has problems in operating life, easy assembly, keeping the parts clean, etc.

SUMMARY OF THE INVENTION

Accordingly, one of the objects of the present invention is to provide a coaxial engine starter free from the above-discussed problems.

Another object of the present invention is to provide a coaxial engine starter in which the output rotary shaft does not directly bump against the armature rotary shaft.

Another object of the present invention is to provide a coaxial engine starter in which the thrust on the output rotary shaft is received by a ball bearing mounted on the front bracket.

Still another object of the present invention is to provide a coaxial engine starter in which the attaching and the detaching of the front bracket can be easily achieved.

A further object of the present invention is to provide a coaxial engine starter in which the mounting front bracket can be easily exchanged.

With the above objects in view, the coaxial engine starter of the present invention comprises an electric motor having a tubular armature rotary shaft and an output rotary shaft disposed at the front end of the electric motor and having at one end a pinion capable of engaging and disengaging an engine ring gear and axially slidably inserted into an inner bore of the armature rotary shaft at the other end. The starter also comprises a planetary speed reduction gear for reducing the rotational speed of the armature rotary shaft, an over-running clutch including a clutch inner member fitted on the output rotary shaft for transmitting the rotation of the armature rotary shaft to the output rotary shaft, and a front bracket including an inner front bracket connected to the electric motor and an outer front bracket connected to the inner front bracket is provided. Also provided is a ball bearing having an inner and an outer race for rotatably supporting the output rotary shaft. The inner race of the bearing is held in its position by the clutch inner member and the pinion, and the outer race of the bearing is held in its position by the inner front bracket and the outer front bracket. The outer front bracket may be detachably connected to the inner front bracket so that the outer front bracket can be detached and attached without disassembling the components contained therein.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 2:
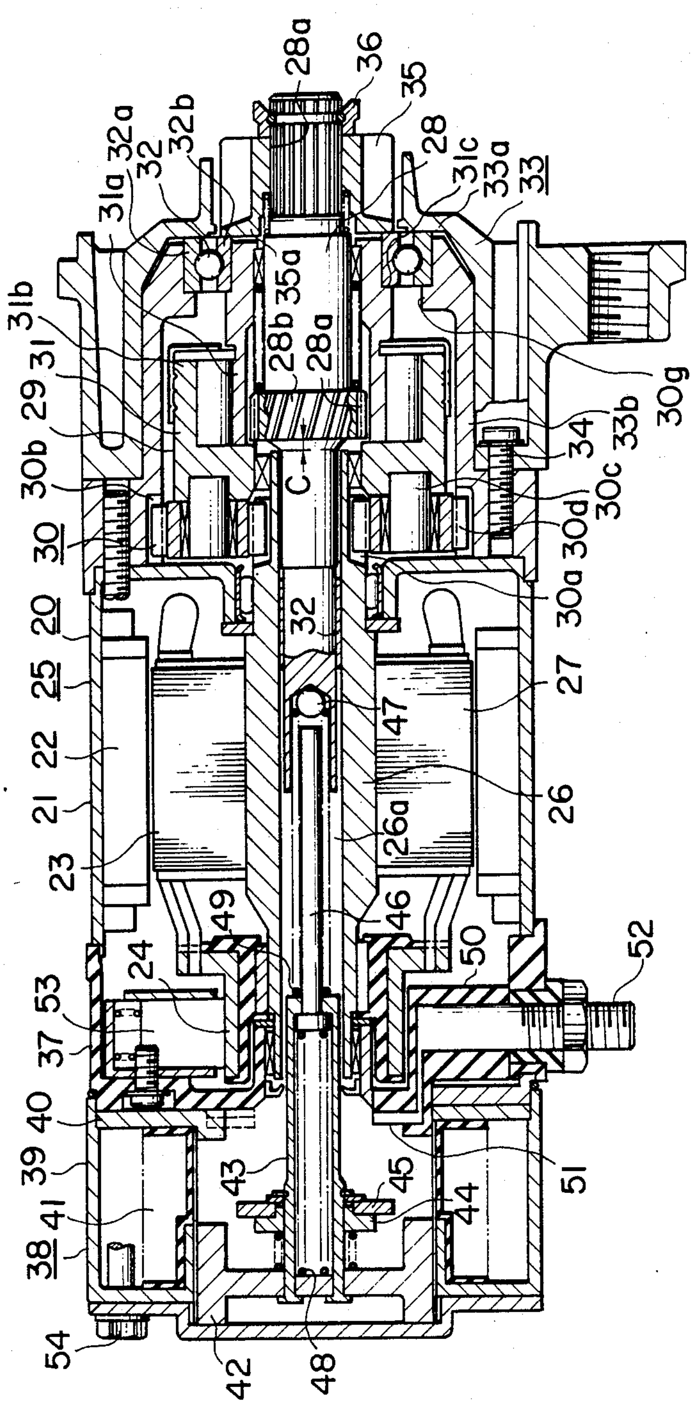
FIG. 2 is a sectional view of a coaxial engine starter of one embodiment of the present invention.

FIG. 2 illustrates a coaxial engine starter 20 of one embodiment of the present invention which comprises a d.c. motor 25 having a yoke 21 serving as a frame of the starter and defining a magnetic circuit, a plurality of permanent magnets 22 mounted on the inner circumferential surface of the yoke 21, an armature 23 rotatably mounted at the center of the yoke 21, and a commutator 24 disposed on one end of the armature 23.

Figure 1:
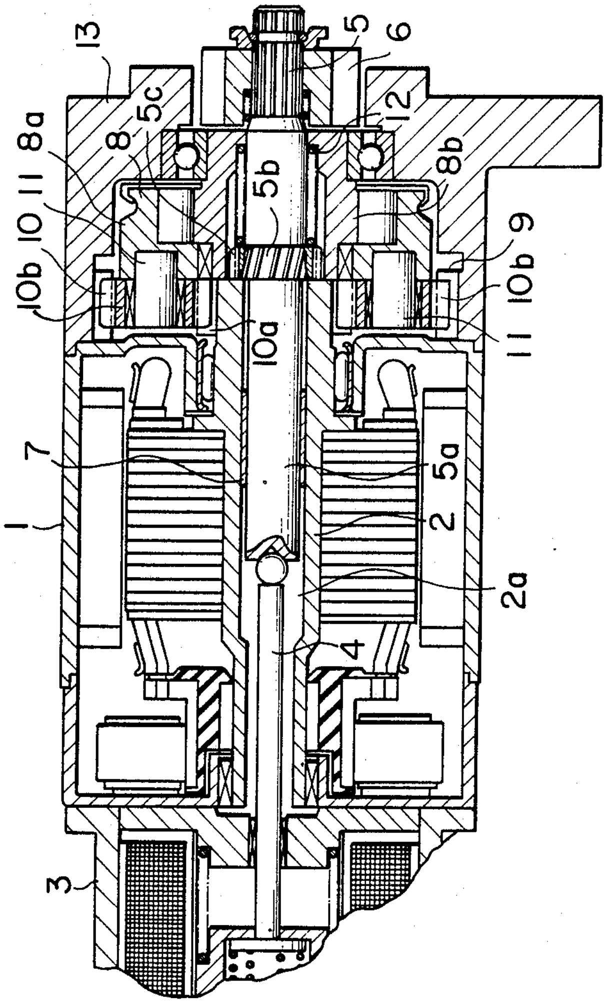
FIG. 1 PRIOR ART
FIG. 1 is a sectional view of the conventional coaxial engine star.

The armature 23 of the d.c. motor 25 comprises a tubular armature rotary shaft 26 and an armature core 27 pressfit over the outer circumference of the tubular armature rotary shaft 26. On the front axial end side (on the right as viewed in FIG. 1) of the d.c. motor 25, an output rotary shaft 28 is disposed in a coaxial relationship with the armature rotary shaft **21*a*. The rotation of the armature rotary shaft 26 of the motor 25 is transmitted to the output rotary shaft through a drive force transmission mechanism 29 including a planetary speed reduction gear 30, an over-running (one-way) clutch 31, and helical splines 28*a* formed in the output rotary shaft 28 and in mesh with the clutch inner member 31*a* of the over-running clutch 31. The output rotary shaft 28 is inserted at its one end into the inner passage 26*a* of the armature rotary shaft 26 and axially slidably supported by a sleeve bearing 32 disposed between the output rotary shaft 28 and the inner surface of the hollow armature rotary shaft 26. It is to be noted that a clearance C is defined between the large-diameter portion 28*b* of the output rotary shaft 28 and the armature rotary shaft 26. This clearance C is provided in order to ensure that the thrust of on the output rotary shaft 28 is not transmitted to the armature rotary shaft 26**.

The rotation of the armature rotary shaft 26 is transmitted to the output rotary shaft 28 through the speed reduction planetary gear 30 and the over-running clutch 31. That is, the planetary speed reduction gear 30 comprises a sun gear **30*a* integrally formed on the outer circumference of one end of the armature rotary shaft 26, an inner gear 30*b* formed in a front bracket 33 which is a frame member of the starter 20, and a plurality of planetary gears 30*d* rotatably supported by shafts 30*c* on a clutch outer member 31*b* of the over-running clutch 31 and in mesh with the sun gear 30*a* and the inner gear 30*b*. Also, the inner circumferential surface of the clutch inner member 31*a* of the over-running clutch 31 are engaged with helical splines 28*c* formed on the cuter circumferential surface of the large-diameter portion 28*b* of the output rotary shaft 28, so that the output rotary shaft 28 is permitted to slide in the axial direction while it can rotate by the rotational force transmitted from the clutch inner member 31*a*. On the front end of the output rotary shaft 28 projecting from the front bracket 33, a pinion 35 is disposed for engagement with the ring gear (not shown) of the engine. The pinion 35 is spline-mounted on the output rotary shaft 28 through splines 28*a* and is held in place by a ring-shaped stopper 36**.

The front bracket 33 comprises an inner front bracket **33*b* attached to the motor yoke 21 by a plurality of bolts 54 which will be described in detail later. The front bracket 33 supports at its front end a ball bearing 62 for rotatably supporting the output rotary shaft 28 . The inner front bracket 33*b* has formed in the rear inner circumference an inner gear 30*b* engaging the planetary gears 30*d* and has formed in the front end a step portion 30*g* in which the rear end of an outer race 32*a* of the ball bearing 62 is engaged. The rear end of an inner race 32*b* of the ball bearing 62 is received at the stepped small-diameter portion 31*c* of the clutch inner member 31*a*, mounted between the front bracket 33 and the clutch inner member 31*a*. The front bracket 33 also comprises an outer front bracket 33*a* fitted over the outer circumference of the inner front bracket 33*b* and detachably but securely attached by bolts 34 to the inner front bracket 33*b*. The outer front bracket 33*b* has a mounting flange 33*c* for connecting the starter to the engine by bolts. The outer front bracket 33*b* also has a front wall 33*a* for supporting the front end of the outer race 32*a* of the ball bearing 62. The front end of the inner race 32*b* of the ball bearing 62 is supported by the rear end surface of the pinion 35** for driving the engine ring gear (not shown).

On the other end side (on the left as viewed in FIG. 2) of the d.c. motor 25, a solenoid switch 38 is mounted. The function of this solenoid switch 38 is similar to that of any conventional solenoid switch. The solenoid switch 38 comprises a switch case 39 mounted to the rear bracket 37 for serving as a yoke, and an excitation coil 41 wound on a bobbin made of a synthetic resin and housed in the case 39. The solenoid switch 38 also comprises an iron core 40 secured to the rear end of the case 39 for defining a magnetic path, a stationary core 40 secured to the front end of the case 39, and a plunger 42 serving as a movable core disposed in an axially movable relationship. The plunger 42 is connected to one end of a non-magnetic tube 43 made of stainless steel in which another non-magnetic rod 46 is telescopically inserted. A movable contact 45 is mounted on the tube 43 through an insulator 44. The projecting end of the rod 46 is inserted into the hollow space **26*a* of the armature rotary shaft 26 to engage at its tip with a steel ball 47 disposed between the armature rotary shaft 26 and the output rotary shaft 28. A compression spring 48 is inserted into the hollow tube 43 for returning the plunger 42 to its home position. A spring 49** is for the purpose of holding the steel ball at place.

A stationary contact 51 is supported by an electrical insulation 50 and is connected to a terminal bolt 52 for external connection. The insulation 50 also insulatingly supports the electrical brushes 53 of the motor 25. The solenoid switch 38, the rear bracket 37, the electric motor 25 and the inner front bracket **33*b* are fastened together by the elongated bolts 54**.

When an unillustrated ignition switch is closed to energize an excitation coil of the solenoid switch 38, the rod 46 is driven forward (to the right as seen in FIG. 2) by an electromagnetic force generated by the excitation of the solenoid switch. Therefore, the output rotary shaft 26 is pushed forward to cause the pinion 28 disposed at its front end to be brought into engagement with the ring gear of the engine. At this time, a movable contact is brought into contact with the stationary contacts to supply electrical power to the d.c. motor 25 to drive it. Therefore, the rotation of the armature rotary shaft 26 is speed-reduced by the planetary speed reduction gear 30 and is transmitted to the output rotary shaft 28 through the over-running clutch 31 to rotate the pinion 35, whereby the engine ring gear is driven by the pinion 35 to start the engine. After the engine has been started, the backward driving of the starter is prevented by the over-running clutch 31, and the output rotary shaft 28, the plunger 42 of the solenoid switch and the rod 46 are returned to their home positions by the respective return springs.

During the returning of the output rotary shaft 22, the rear end surface 35*a* of the pinion 35 abuts against the front end surface of the inner race 32*b* of the ball bearing 32 mounted on the reduced-diameter portion 31*c* of the clutch inner member 31*a* of the over-running clutch 31. Since this ball bearing 32 is also held at its outer race by the inner front bracket 33*b*, the thrust applied to the ball bearing 32 from the pinion 35 is received by the inner front bracket 33*b* connected to the motor yoke 21. Thus, the relative rotation between the pinion 35 and the motor 25 can be accommodated in the ball bearing 32, so that there is no substantial relative slip or rotation between any components of the starter mechanism, no significant wear is observed at the interface between the adjacent components. Also the impact applied to the starter motor when the pinion and the output rotary shaft, etc. return to their original position is received by the ball bearing 32 and transmitted to the motor yoke 21, the damages due to the bumping and the slippage can be reduced, ensuring a relatively long operating life.

Further, since the front bracket 33 comprises the inner front bracket 33*b* connected to the motor yoke 21 and the outer mounting front bracket 33*a* detachably connected to the inner bracket 33*b*, only the outer front bracket 33*a* can be removed from the inner front bracket 33*b* when an already assembled starter is to be used with different engine. This can be done without the need for other parts being disassembled or exposed, so that there is no need for these parts to be protected from being polluted by dust or foreign matter and reassembled.

What is claimed is:

1. A coaxial engine starter comprising
an electric motor having a tubular armature rotary shaft;
an output rotary shaft disposed at a front end of said electric motor and having at a first end a pinion and axially slidably inserted into an inner bore of said armature rotary shaft at a second end;
planetary speed reduction gear including a sun gear formed around an outer periphery of a front end of said armature rotary shaft and a plurality of planetary gears meshing with said sun gear for reducing the rotational speed of said armature rotary shaft;
an over-running clutch including a clutch inner member fitted on said output rotary shaft for transmitting the rotation of said armature rotary shaft transmitted through said planetary speed reduction gear to said output rotary shaft;
a front bracket including an inner front bracket connected to said electric motor and containing therein at least said overrunning clutch and said planetary speed reduction gear and an outer front bracket connected to said inner front bracket;
a ball bearing having an inner and an outer race for rotatably supporting said output rotary shaft, said inner race of said bearing being held in its position by said clutch inner member and said pinion, and said outer race of said bearing being held in its position by said inner front bracket and said outer front bracket.

2. A coaxial engine starter as claimed in claim 1, wherein said outer front bracket is detachably connected to said inner front bracket, whereby said outer front bracket can be detached and attached without disassembling components contained therein.

* * * * *